May 9, 1944. C. E. SLAUGHTER 2,348,658
PLASTIC TRIM
Filed Feb. 6, 1941
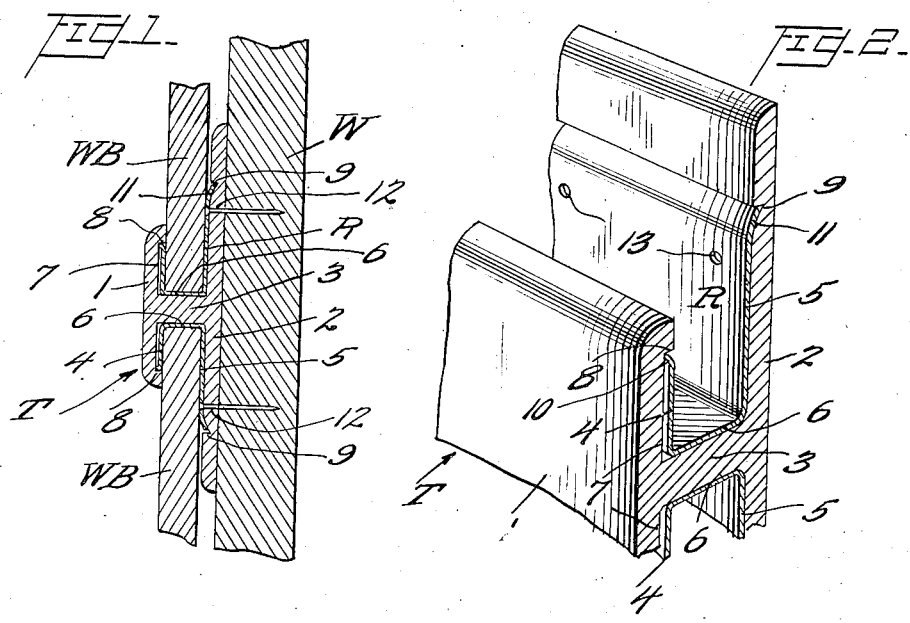
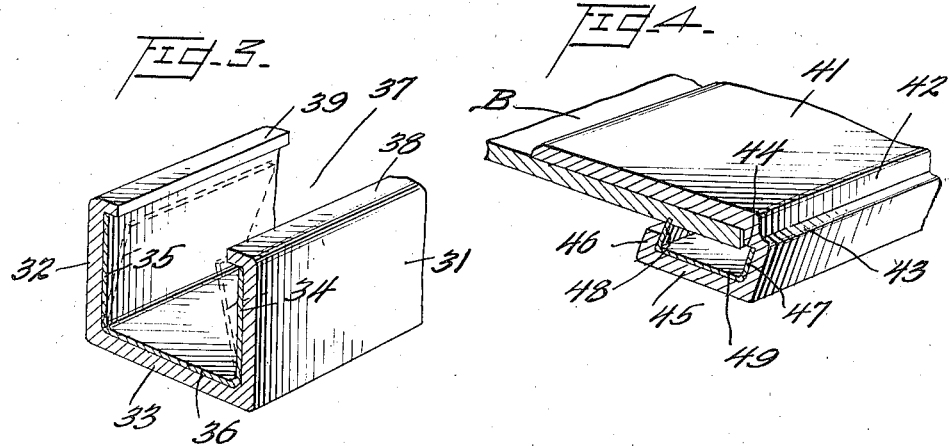
Inventor
Charles E. Slaughter,
By Sol Shappiro
Attorney Patented May 9, 1944

2,348,658

UNITED STATES PATENT OFFICE 2,348,658

PLASTIC TRIM

Charles E. Slaughter, New Canaan, Conn., assignor to Extruded Plastics, Inc., Norwalk, Conn., a corporation of Connecticut Application February 6, 1941, Serial No. 377,728

7 Claims. (Cl. 20—74)

This invention relates to plastic trim and more particularly to extruded material especially in continuous lengths available for various purposes, and to structures including such trim.

Among the objects of the present invention is the economical production of plastic trim particularly from extruded products in the form of strip type structures.

This specification is a continuation-in-part of application Serial No. 351,589, filed August 6, 1940, entitled "Plastic overlay."

Other objects include plastic trim of the character set forth above provided with reenforcements to eliminate cold flow of the plastic.

Still further objects include the production of wall structures including such plastic trim.

Additional objects and advantages will appear from the more detailed description set forth below, it being understood however that such more detailed description is given by way of illustration and explanation and not by way of limitation since various changes may be made therein by those skilled in the art without departing from the scope and spirit of the present invention.

In accordance with that more detailed description, there is shown in the accompanying drawing, in Figure 1, a transverse vertical section through a wall structure embodying the present invention; in Figure 2, an enlarged fragmentary perspective of the structure of Figure 1; in Figure 3, a perspective of a modified form of the invention; and in Figure 4, a perspective of a further modified form of the invention.

In accordance with the present invention, plastic trim is produced particularly by extrusion in the form of continuous strips of material having a configuration that particularly adapts it to use in accordance with the purposes of this invention. Such plastic trim is especially desirable for use as trim and support strips in connection with walls and wall board and for analogous purposes and such utilization will be employed below to explain and illustrate the invention. For these purposes, the plastic trim is extruded in substantially continuous lengths with a configuration in cross-section showing side portions or walls joined by a web member, of which the U-shape is exemplary. When extruded, the side or wall portions will be integral with the web portion to produce a simple but sturdy product.

While such plastic trim as is described above, may be readily used in and of itself for application to wall-board along the edges thereof and for many other purposes, it is desirably reenforced by reenforcements preferably placed within the strip, as for example within the well of the U-shaped member, these reenforcements particularly when of metal, either extruded or rolled, yielding important characteristics to the structures in which they are included. For example, they serve the very important function of preventing cold flow of the plastic, and substantially eliminate warping, expansion or other distortion as for example resulting from humidity changes, they serve materially to increase the strength of the structures, and they are readily incorporated into the plastic trim. If spring metal reenforcements are utilized, they may be snapped into position within the plastic trim. If heavier metal reenforcements are used, the plastic trim may in some cases be snapped into position about the reenforcement, or the latter may be inserted edgewise into the trim. Reenforcements of sufficiently rigid material other than metal, as for example some of the harder plastics may be used in the same way, but the metal reenforcements represent a more desirable form of the invention. In some cases the plastic can be extruded about the metal or other reenforcement, but such methods are not as readily employed as those referred to above.

Considering the drawing, there is shown in Figure 1, a wall structure embodying the present invention. The supporting wall W is faced by wall board sections WB, WB, which are held in position and the contiguous edges of which are finished off or decorated by the plastic trim T of the present invention. As shown in Figures 1 and 2, the trim 2 comprises side portions 1 and 2 joined by the web 3 as viewed in cross section, the trim desirably being cut to the desired length from a continuous strip having the cross-sectional configuration noted. In essence this form of trim may be said to be double-U in cross section with the web forming the base of the U sections, and the arms of the U shaped portions being of unequal length so that the side 2 which seats against the wall W is wider and serves as a more substantial base, while the side 1 covers the exposed edges of the wall board WB, WB and is desirably narrower than side 2 to give a more pleasing appearance. The thickness of side 2 serves to position the wall board WB from the wall W.

In such wall structures, where the weight or pressure of structural members may produce cold flow, and for other purposes as set forth above, a reenforcement is desirably employed with the plastic trim, such reenforcement being indicated at R. Desirably the reenforcement is of metal, rolled or extruded, into the desired shape which should conform in cross section with that of the plastic trim with which it is to be employed. Consequently in this case the reenforcement R is shown as having side members 4 and 5 joined by the web 6, making the reenforcement substantially U-shaped in cross-section, and in size the reenforcement is made to fit snugly within the well 7 or space between the arms of the U-shaped plastic trim, the side 4 lying against the plastic trim side 1, being narrower than side 5 lying against the plastic trim side 8, while web 6 abuts web 3 of the plastic.

If desired, the reenforcement may be anchored in position within the trim in any desired way. For example, the inner walls of the side portions 1 and 2 may be provided with grooves 8 and 9 respectively, and the outer edges of the reenforcement sides 4 and 5 may be turned outwardly as indicated at 10 and 11, so that these outwardly turned edges of the reenforcement seat within the grooves 8 and 9 and securely hold the reenforcement in position. A reenforcement may be secured in each U-shaped portion of the trim in this way.

In such wall structures, the trim and reenforcement is desirably supplied with means to hold it in place on the wall W for which purposes openings or holes 12 may be provided in the trim sides 2 with similar holes 13 in the reenforcement sides 5, these sets of holes aligning with each other and enabling fastening elements to be driven in place. Such holes or openings may be provided at regular intervals in the continuous lengths of plastic trim and reenforcement.

The production of trim and support strips and their utilization in the building of wall structures will be apparent without more from the description and explanation given above. Desirably the plastic trim is made by extrusion, the reenforcement preferably of spring sheet metal is made by rolling or extrusion, and the two elements are then assembled as set forth above in any desired way and utilized in the construction of wall structures for the production of ornamental finished structures, readily assembled from relatively inexpensive products, giving decorative effects without sacrifice of strength or utility, and avoiding defects that might otherwise appear in the use of plastic trim for such purposes. While the production of wall structures has been used to exemplify the invention, the trim of the present invention has a wide and diversified utility.

This is well illustrated by the form shown in Figure 3 where the trim takes a cross-sectional shape of channel type having sides 31, 32 joined by web 33, giving substantially a U-shaped member in cross-section having the arms of the U of substantially equal length or height. While such trim desirably formed by extrusion in continuous lengths may be used as such, it may be strengthened by a reenforcement having side portions 34, 35 joined by web 36 giving in cross section a U-shaped member and made of a size to seat within the well or space 37 of the trim. When made of sheet metal of sufficient spring, the reenforcement may be snapped into position within the plastic as indicated by the dotted lines in Figure 3. Here too, it is desirable to anchor the reenforcement in position for which purpose the outer edges of the sides 31, 32, may be inturned to form shoulders 38, 39 respectively against which the corresponding edges of the reenforcement abut. Consequently when the reenforcement is snapped or pushed endwise into position within the plastic trim, it is positively retained in place. Trim of the character of Figure 3 may be used for a variety of purposes as along the exposed edges of wall board or any other type of board, or along the edges of sheet material of any type whether wood, metal, plastic, glass, etc.

In the form shown in Figure 4, in general it may be said to simulate a structure representing a half portion of the trim of Figures 1 and 2. Here again there may be said to be side portions joined by a web portion as will appear below. The body portion 41 carries a flange 42 desirably off-set as shown at 43 to provide an inner shoulder 44. The flange 42 is turned inwardly to provide a face portion 45 substantially parallel with the body portion 41. The inner edge of the face portion 45 may be inturned to form a shoulder 46.

A reenforcement may be provided in this case also, taking the form of a member substantially U-shaped in cross-section having side portions 47, 48 joined by the web 49 the size of the reenforcement closely approaching that of the well or space between portions 42, 45, and 46 of the plastic trim so that the reenforcement will seat in such space. In use, this form of invention may be placed about or along the edge of a board B, the edge of the board being forced into the space between the body portion 41 and the face portion 45 until the board engages the flange 42. The end of the reenforcement bites into the under surface of the board B while the other end thereof is anchored against the shoulder 44.

Trim and support elements of the present invention are desirably produced from materials of sufficient flexibility to enable utilization in the manners indicated so that if necessary they may be flexed into position. For the plastic any extrudable material may be used where the product is to be produced by extrusion and this is most desirable since continuous lengths of product may be readily produced. Suitable materials include thermoplastic substances of resinous or related type such as cellulose acetate, cellulose aceto-butyrate, ethyl cellulose, polymerized vinyl derivatives and other resinous derivatives or compositions of these or mixtures of substances exhibiting the properties desired.

The reenforcements are desirably of harder or more rigid substances whether metallic or non-metallic, and rolled or extruded metal, particularly spring sheet metal may be used as of aluminum, brass, bronze or other metals and metallic alloys.

The plastic trim may be made to harmonize with any color scheme and lends itself to the use of pigmented, dyed or otherwise colored substances. The exposed edges of the plastic may be given any desired configuration desired, included are edges that are rounded, ribbed, square. etc. The plastic trim and reenforcement may be straight, curved, angular, etc. to suit particular situations. The plastic may be opaque, translucent or transparent, mottled, etc., and may carry surface ornamentation produced at the time of extrusion or subsequently.

Having thus set forth my invention, I claim:

1. A trim and support strip for holding wallboard in position on a wall, said strip comprising an extruded, continuous, elongated, firm, synthetic resinous, thermoplastic strip having in cross-section substantially parallel wide thin side portions joined by a narrow web to form a channel to receive wallboard, and a rigid reenforcement of material different from said plastic strip which reenforcement substantially conforms with and is contiguous to the inner walls of the channel of said plastic strip the thermoplastic strip without the reenforcement being subject to cold flow and distortion in use, the reenforcement although not itself a functional structural shape capable of use alone, preventing such cold flow and distortion in use.

2. A trim and support strip as set forth in claim 1, in which the reenforcement is of flexible spring metal and is substantially U-shaped in cross-section.

3. A trim and support strip as set forth in claim 1, in which the reenforcement is of spring metal and substantially U-shaped in cross-section and in which means are provided to hold the reenforcement in position against the walls of the plastic strip.

4. A trim and support strip as set forth in claim 1, in which the plastic strip is channel-shaped in cross-section of substantially U-shaped contour, at least one edge of the arm of the U being inturned, and the reenforcement is metal of U-shaped cross-section one edge of which seats against the inturned portion of the plastic strip.

5. A trim and support strip as set forth in claim 1, in which the plastic strip is substantially H-shaped in cross-section and there is a reenforcement within each channel of the H-shaped strip.

6. A board carrying a trim and support strip as set forth in claim 1 along one edge thereof.

7. Plastic trim in the form of an extruded, continuous, elongated, firm, synthetic resinous thermoplastic strip having in cross-section thin side portions joined by a narrow web forming an open channel, and a flexible sheet metal reenforcement conforming with and contiguous to the inner walls of the channel in said plastic strip, the thermoplastic strip without the reenforcement being subject to cold flow and distortion in use, the reenforcement, although of sheet metal and not itself a functional structural shape capable of use alone, preventing such cold flow and distortion in use.

CHARLES E. SLAUGHTER.